United States Patent [19]
Workman et al.

[11] Patent Number: 5,097,103
[45] Date of Patent: Mar. 17, 1992

[54] LOCK FOR TROLLEY CONNECTOR

[75] Inventors: James B. Workman, Montcoal; Bennie W. Milam, Arnett, both of W. Va.

[73] Assignee: Peabody Coal Company, St. Louis, Mo.

[21] Appl. No.: 501,046

[22] Filed: Mar. 29, 1990

[51] Int. Cl.$^5$ .......................... B60L 5/00; H01R 13/44
[52] U.S. Cl. .................................... 191/50; 191/1 R; 439/133; 439/134
[58] Field of Search ............. 439/133, 134; 191/45 R, 191/8, 52, 60.5, 64, 71, 50, 1 R

[56] References Cited

U.S. PATENT DOCUMENTS

| | | | |
|---|---|---|---|
| 1,824,657 | 9/1931 | Coldwell | 191/1 R |
| 4,653,824 | 3/1987 | Jason et al. | 439/134 |
| 4,673,230 | 6/1987 | Baumgart | 439/133 |
| 4,679,873 | 7/1987 | Brackett, Jr. | 439/134 |
| 4,721,475 | 1/1988 | Burke, Jr. | 439/133 |
| 4,750,898 | 6/1988 | Soulard | 439/133 X |
| 4,812,131 | 3/1989 | Sieverman | 439/134 |
| 4,957,445 | 9/1990 | Burke, Jr. | 439/134 |

FOREIGN PATENT DOCUMENTS

| | | | |
|---|---|---|---|
| 15806 | 11/1955 | Fed. Rep. of Germany | 439/133 |
| 1354173 | 1/1964 | France | 439/133 |

*Primary Examiner*—Frank E. Werner
*Assistant Examiner*—Scott L. Lowe
*Attorney, Agent, or Firm*—Senniger, Powers, Leavitt & Roedel

[57] ABSTRACT

A locking apparatus for electrically isolating a trolley-type electrical connector on the end of a conduit on an electrical mining machine or the like, to prevent an electrical connection from being made with the connector. The locking apparatus comprises an open-ended sheath made from an electrically insulating material, slidably mounted on the end of the conduit, to slide between an extended position in which the sheath surrounds the connector, and a retracted position in which the connector projects through the open end of the sheath. The sheath has aligned openings on opposite sides thereof, adjacent the open end of the sheath. A locking member is adapted to extend through the aligned openings and substantially block the open end of the sheath. A retaining cord tethers the locking member to the sheath. A lock can be used to secure the locking member in its position blocking the open end of the sheath.

6 Claims, 2 Drawing Sheets

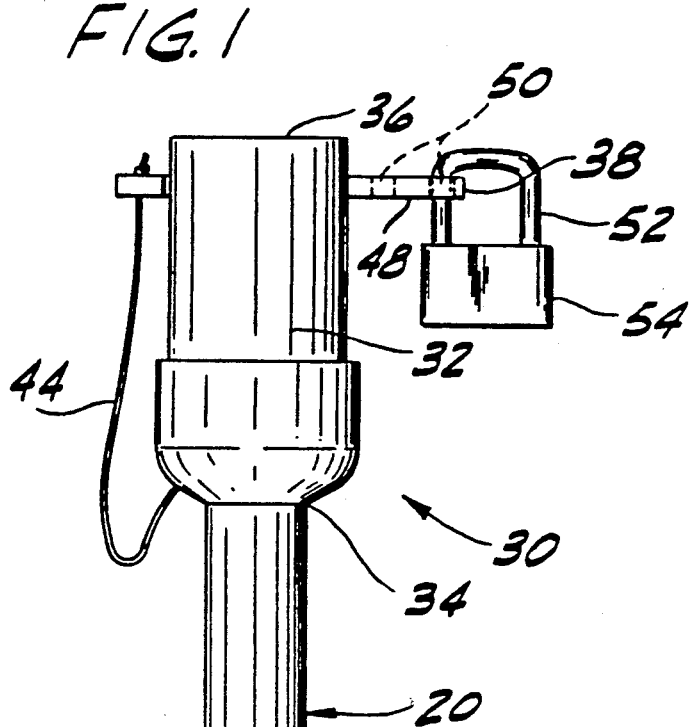
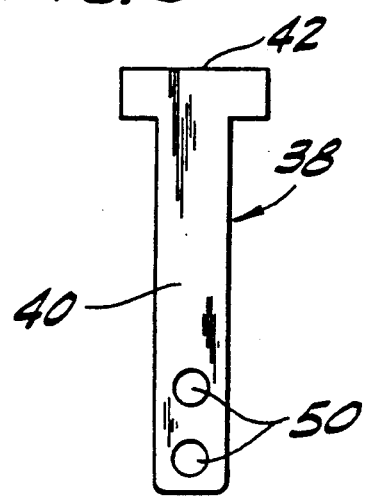
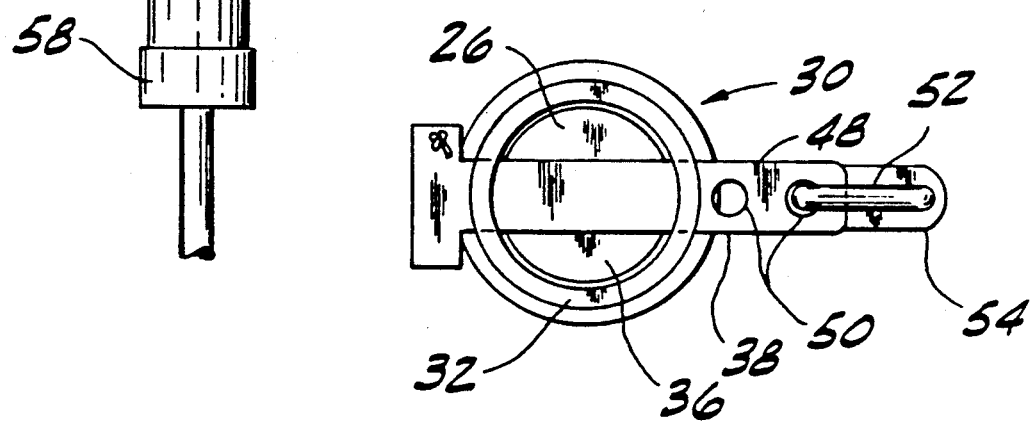
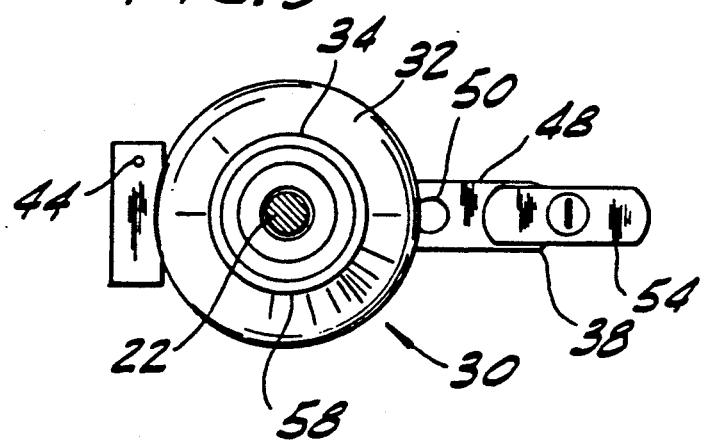

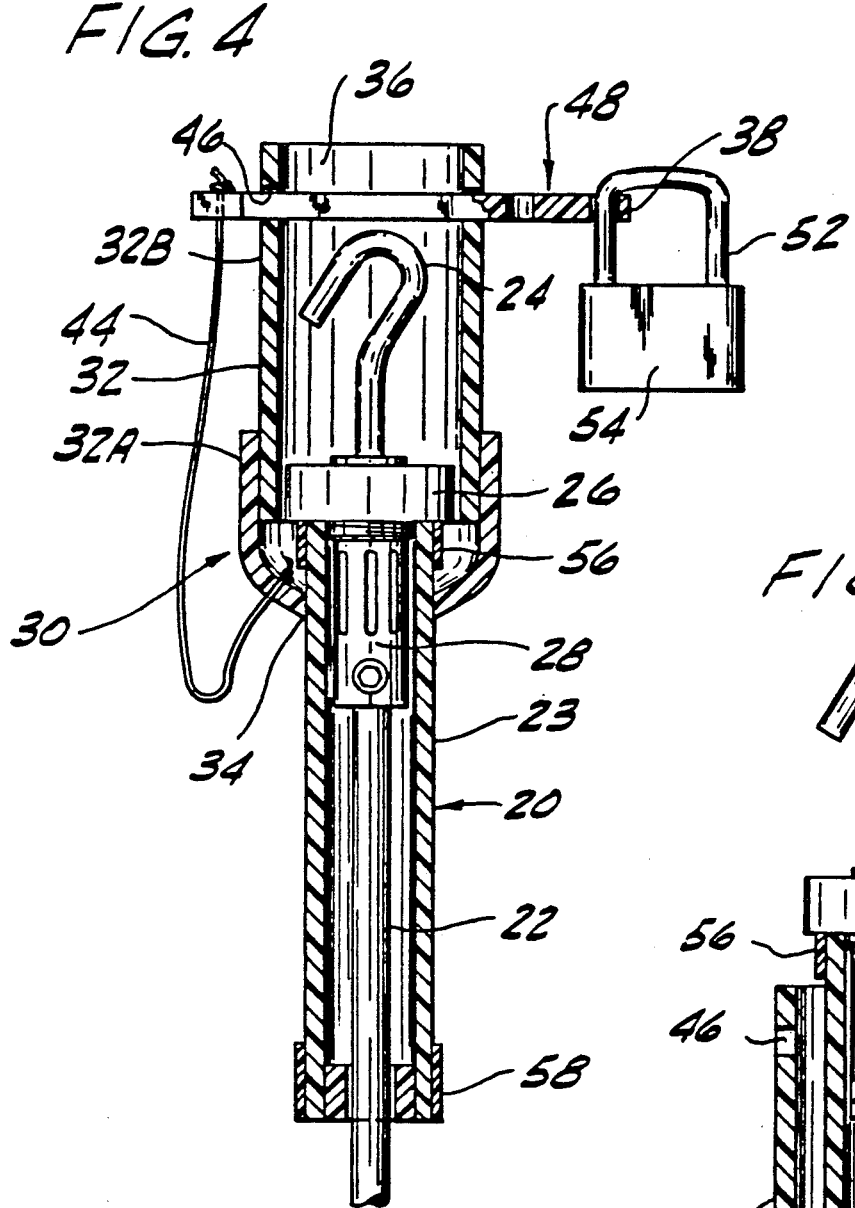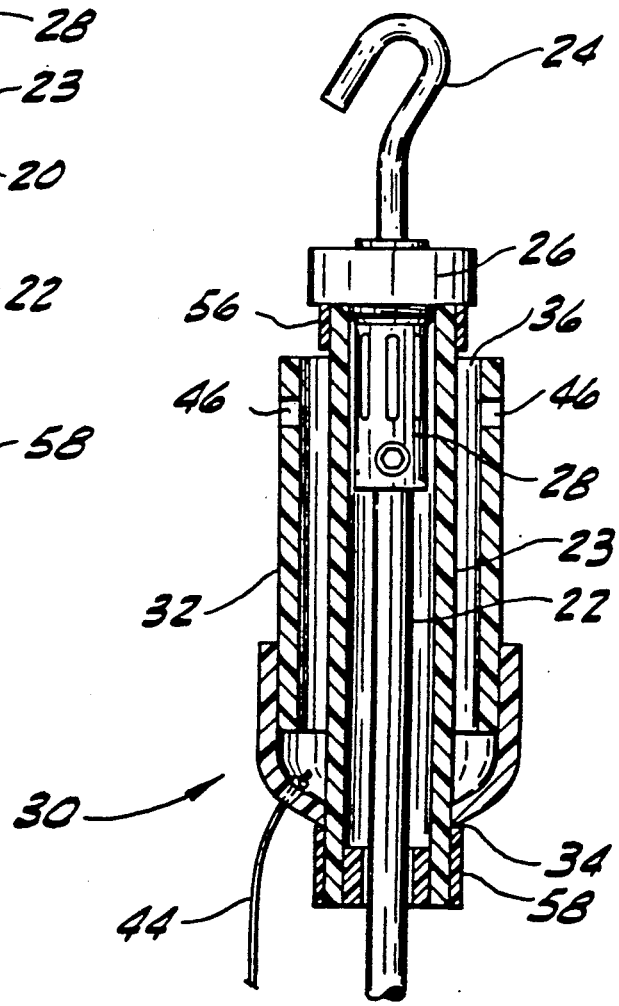

LOCK FOR TROLLEY CONNECTOR

BACKGROUND OF THE INVENTION

This invention relates to trolley connectors on electric mining machinery and the like, and in particular to a locking apparatus for electrically isolating such trolley connectors.

Some of the electrical machinery used in mining is electrically powered like a trolley, with a conduit extending from the machine and connecting with a power line. Typically the conduit comprises an insulated cable for conducting electricity to the machine, and has a hook-like connector at the end for connecting with the power line. Often a fuse is connected between the connector and the cable. When the machine is broken or under repair, it is important that it not be connected to a power line. Indeed, some government regulations require that the connectors be secured in such a manner that they cannot be inadvertently connected when the machine is broken or under repair.

SUMMARY OF THE INVENTION

It is therefore among the objects of the present invention to provide a locking apparatus for a trolley-type connector for electrically isolating the trolley-type connector; it is also among the objects of this invention to provide such a locking apparatus that is of simple construction, that has a minimum of parts, and which is easy to operate; and it is also among the objects of this invention to provide such a locking apparatus that is relatively inexpensive.

The locking apparatus of the present invention is adapted for electrically isolating a trolley-type electrical connector on the end of a conduit on an electrical mining machine or the like. The locking apparatus prevents an electrical connection from being made with the connector. Generally the locking apparatus comprises an open-ended sheath made from an electrically insulating material. The sheath is slidably mounted on the end of the conduit, and is adapted to slide between an extended position in which the sheath surrounds the connector, and a retracted position in which the connector projects through the open end of the sheath. Stops can be provided on the conduit to limit the sliding movement of the sheath relative to the conduit.

Electric insulating means is provided to releasably block the open end of the sheath to enclose and retain the connector in the sheath. The means for releasably blocking the open end of the sheath preferably comprises a locking member, and means for releasably securing the locking member across the open end of the sheath. The sheath preferably includes aligned openings on opposite sides thereof, adjacent the open end, through which the locking member can be inserted to block the open end of the sheath. Means, for example a lock that fits through a hole in the locking member, is provided to releasably secure the locking member in its position blocking the open end of the sheath. A retaining cord preferably tethers the locking member to the sheath.

Thus, the locking apparatus of this invention can electrically isolate a trolley-type connector, and prevent accidental or inadvertent powering of the machine. The locking apparatus is of simple construction, comprising two principle parts that are tethered together so that they do not become separated. The locking apparatus slides on the end of the conduit and the locking member slides into aligned openings, and thus the locking apparatus is very easy to use. Because of the simple construction, the locking apparatus is relatively inexpensive.

These and other advantages will be in part apparent and in part pointed out hereinafter.

BRIEF DESCRIPTION OF THE DRAWINGS

FIG. 1 is a side elevation view of a locking apparatus constructed according to the principles of this invention, in its closed or locked position with the locking member blocking the open end of the sheath to isolate a trolley-type connector;

FIG. 2 is a top plan view of the locking apparatus as shown in FIG. 1;

FIG. 3 is a bottom plan view of the locking apparatus as shown in FIG. 1;

FIG. 4 is a longitudinal cross-sectional view of the locking apparatus as shown in FIG. 1;

FIG. 5 is a longitudinal cross-sectional view of the locking apparatus in its open or unlocked position; and FIG. 6 is a plan view of the locking member.

Corresponding reference numerals indicate corresponding parts throughout the several views of the drawings.

DETAILED DESCRIPTION OF THE PREFERRED EMBODIMENT

Some of the electrical machinery used in mining is electrically powered like a trolley, with a conduit extending from the machine and connecting with a power line. A portion of such a conduit is indicated generally as 20 in FIG. 4. The conduit comprises an electrical connector 24 in the form of a hook, for example, for connecting the conduit to a power line to provide electric power to the machine. As shown in FIGS. 4 and 5, the connector 24 is threadably attached via a cap 26 to a holder 28 for a replaceable fuse (not shown) interposed between the connector 24 and an insulated cable or conductor 22 for conducting electric power to the machine. The fuse and fuse holder 28 (i.e., fuse means) are contained within a tubular housing 23 attached to and extending down from the cap 26. The insulated cable 22 extends up through the lower end of this housing 23 and is suitably connected to the fuse holder to provide a conductive path to the hook-like connector 24.

A locking apparatus constructed according to the principles of the present invention is indicated generally as 30 in the Figures. The locking apparatus 30 comprises a sheath or cover 32 having a first (lower) end 34 slidably mounted on the conduit 20, and a second (upper) end 36 which is open. The sheath 32 is adapted to slide between an extended position in which the sheath 32 surrounds the connector 24, (see FIGS. 1 and 4), and a retracted position in which the connector 24 projects through the open end 36 of the sheath (see FIG. 5). As shown in FIG. 4, the sheath is of two-part construction, comprising a tubular base 32A having a lower end 34 of reduced diameter slidably engageable with the housing 23, and a cylindric body 32B extending up from the base 32A and having an open upper end 36. The base 32A and body 32B of the sheath are coaxially disposed with respect to the tubular housing 23. The sheath is made from an non-conducting material, for example PVC or some other suitable plastic.

An electric insulating means is provided for selectively blocking the open end 36 of the sheath 32 to enclose and retain the connector 24 in the sheath 32. This means is preferably locking member or bar 38 adapted to be releasably secured across the open end 36 of the sheath 32. As best shown in FIG. 6, the locking member 38 is preferably generally T-shaped, comprising a stem 40 and a cross member 42. The locking member is made from a non-conducting material, for example PVC or some other suitable plastic. A retaining cord 44 tethers the locking member 38 to the sheath 32 so that these parts do not become separated.

The sheath 32 may be provided with aligned openings 46 on opposites sides thereof, adjacent the open end 36, for mounting the locking member. The openings are sized to receive the locking member 38, and particularly the stem 40 of the locking member 38, so that the locking member extends across the open end 36 of the sheath, substantially blocking the open end. A portion 48 of the stem 40 of the locking member 38 extends beyond the wall of the sheath 32. Some means is provided to engage this portion and releasably secure the locking member in position. For example, one or more holes 50 may be provided in portion 48 which can be engaged by the shackle 52 of a standard lock 54 to prevent the locking member 38 from being withdrawn from the openings 46 in the sheath 32.

First stop means comprising a stop ring 58 is secured to the lower end of the housing 23 for engagement by the lower end of the sheath 32 to stop the sheath in its retracted position. The stop ring 58 thus limits movement of the sheath in downward direction and prevents it from sliding off the housing and down the conductor 22 in a direction away from connector 24. Second stop means comprising a second stop ring 56 is secured to the upper end of the housing immediately below the cap 26. This stop 56 is also engageable by the lower end of the sheath 32 to stop the sheath in its extended position. The stop ring 56 thus limits movement of the sheath in upward direction and prevents it from sliding off the housing. Alternatively, the cap 26 could act as a stop to restrict movement of the sheath upwardly beyond its extended position.

OPERATION

The locking apparatus of the present invention may be provided as part of the conduit 20, or it may be provided separatedly and installed as needed. In either case, when it is desired to remove a machine from service, the conduit 20 is simply disconnected from the power line, and the sheath 32 is slid up around the connector 24. The stem 40 of the locking member 38 is fit through the aligned openings 46 in the sheath. The shackle 52 of a lock 54 is looped through one of the holes 50 in the portion 48 of the stem protruding from the sheath 32. The lock 54 prevents the locking member 38 from being withdrawn. The locking member 38 blocks access to the connector 24 through the open end 36 of the sheath 32, thereby preventing inadvertent or accidental connection of the connector 24 to a power line. A explanatory tag can also attached to the locking apparatus 30 through one of the holes 50.

When it is desired to put the machine back in service, the lock 54 is unlocked and the shackle 52 is removed from the hole 50. The locking member 38 is withdrawn from the aligned openings 46 in the sheath 32, and the sheath 32 is slid back to expose the connector 24. The cord 44 prevents the locking member from becoming lost. The locking apparatus can be left in the conduit or it can be removed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A locking apparatus for electrically isolating a trolley-type electrical connector on the end of a conduit on an electrical machine to prevent an electrical connection from being made with the connector, the apparatus comprising:

an open-ended sheath, made from an electrically insulating material, adapted to be slidably mounted on the end of the conduit, to slide between an extended position in which the sheath surrounds the connector, and a retracted position in which the connector projects through the open end of the sheath;

electric insulating means for releasably blocking the open end of the sheath to enclose and retain the connector in the sheath; and first stop means on the conduit engageable by said sheath to stop the sheath in its said retracted position, said stop means serving to limit movement of the sheath relative to the conduit in a direction away from its extended position, said conduit comprises a tubular housing with opposite ends, and fuse means in the housing adapted for connection to said electrical connector with the connector extending from one end of the housing, said fuse means also being adapted for connection to an electrical conductor with the conductor extending from the other end of the housing for delivery of electric power to the machine, said sheath being slidable on the outside of the housing relative to the housing and relative to the electrical connector and conductor between its said extended and retracted positions.

2. Locking apparatus as set forth in claim 1 wherein said stop means is disposed on the outside of the housing generally adjacent said other end thereof.

3. Locking apparatus as set forth in claim 2 further comprising second stop means disposed generally adjacent said one end of the housing for engagement by said sheath to stop the sheath in its said extended position, said second stop means serving to limit movement of the sheath relative to the housing in a direction away from its said retracted position.

4. Locking apparatus as set forth in claim 1 further comprising second stop means on the conduit spaced from said first stop means, said second stop means being engageable by said sheath to stop the sheath in its extended position, said second stop means serving to limit movement of the sheath relative to the conduit in a direction away from its said retracted position.

5. Locking apparatus as set forth in claim 4 wherein said releasable blocking means comprises a locking bar, aligned openings in the sheath generally adjacent its open end for receiving said locking bar therethrough so that the locking bar substantially blocks the open end of the sheath and prevents it from being moved to its said retracted position, and means for tethering the locking bar to the sheath.

6. Locking apparatus as set forth in claim 1 wherein said sheath comprises a tubular base having a lower end of reduced diameter slidably engageable with the housing, and a cylindric body extending up from the base having an open upper end, said tubular base and cylindric body being generally coaxially disposed with respect to said tubular housing.

* * * * *